(12) United States Patent
Matthews et al.

(10) Patent No.: US 10,661,343 B2
(45) Date of Patent: May 26, 2020

(54) SMART ADDITIVE MANUFACTURING DEVICE

(71) Applicant: Additec Additive Technologies, LLC, Las Vegas, NV (US)

(72) Inventors: Brian Matthews, Las Vegas, NV (US); Lukas Hoppe, Bremen (DE)

(73) Assignee: ADDITEC ADDITIVE TECHNOLOGIES, LLC, Las Vegas, NV (US)

( * ) Notice: Subject to any disclaimer, the term of this patent is extended or adjusted under 35 U.S.C. 154(b) by 289 days.

(21) Appl. No.: 15/967,936

(22) Filed: May 1, 2018

(65) Prior Publication Data

US 2018/0318929 A1     Nov. 8, 2018

Related U.S. Application Data

(60) Provisional application No. 62/606,135, filed on May 2, 2017, provisional application No. 62/508,535, filed on May 19, 2017.

(51) Int. Cl.
*B23K 9/04*     (2006.01)
*B22F 3/115*     (2006.01)
(Continued)

(52) U.S. Cl.
CPC ............ *B22F 3/115* (2013.01); *B22D 23/003* (2013.01); *B23K 26/0604* (2013.01); *B23K 26/0608* (2013.01); *B23K 26/0648* (2013.01); *B23K 26/0876* (2013.01); *B23K 26/127* (2013.01); *B23K 26/144* (2015.10); *B23K 26/1464* (2013.01); *B23K 26/342* (2015.10);
(Continued)

(58) Field of Classification Search
CPC ........ B22F 3/105; B22F 3/1055; B22F 3/115; B33Y 10/00; B33Y 30/00; B22D 23/003; C23C 4/02; C23C 4/123; C23C 4/134; C23C 4/185; B23K 26/0604; B23K 26/0608; B23K 26/0622; B23K 26/0626; B23K 26/0648; B23K 26/0676; B23K 26/0736; B23K 26/082; B23K 26/0876; B23K 26/127; B23K 26/14; B23K 26/142; B23K 26/1423; B23K 26/144; B23K 26/146; B23K 26/1462; B23K 26/1464; B23K 26/147; B23K 26/1476; B23K 26/32; B23K 26/34; B23K 26/342; B23K 26/345
USPC ....... 219/76.1–76.16, 121.6, 121.63–121.66, 219/121.73–121.77, 121.85
See application file for complete search history.

(56) References Cited

U.S. PATENT DOCUMENTS 6,504,127 B1 * 1/2003 McGregor ......... B23K 26/0604
                                                                219/121.64
2010/0326962 A1* 12/2010 Calla .................... B23K 9/0956
                                                                 219/76.1

(Continued)

*Primary Examiner* — Hung D Nguyen
(74) *Attorney, Agent, or Firm* — Gerald R. Prettyman

(57) ABSTRACT

Disclosed is a multiple-feature compact direct-metal deposition additive manufacturing (AM) print head. The head configures off-axis, solid-state diode or diode-pumped lasers into an array to perform precision controlled, direct metal deposition printing through a single print nozzle. Dual-mode printing capability using metal wire and powder feedstock sources in the same print nozzle is provided with in-line control, precision wire feed driver/controller, adjustable shield gas diffuser, and nozzles tailored to wire feedstock diameter.

17 Claims, 12 Drawing Sheets

(51) Int. Cl.
*B33Y 10/00* (2015.01)
*B33Y 30/00* (2015.01)
*B22D 23/00* (2006.01)
*C23C 4/123* (2016.01)
*B23K 26/342* (2014.01)
*B23K 26/08* (2014.01)
*B23K 26/06* (2014.01)
*B23K 26/12* (2014.01)
*B23K 26/14* (2014.01)
*C23C 4/18* (2006.01)
*B23K 26/144* (2014.01)
*B23K 26/00* (2014.01)

(52) U.S. Cl.
CPC ............... *B33Y 10/00* (2014.12); *B33Y 30/00* (2014.12); *C23C 4/123* (2016.01); *C23C 4/185* (2013.01)

(56) References Cited

U.S. PATENT DOCUMENTS

| | | | | |
|---|---|---|---|---|
| 2012/0097645 A1* | 4/2012 | Clark | ................ | B23K 15/0006 219/121.64 |
| 2013/0213942 A1* | 8/2013 | Peters | ................ | B23K 9/1093 219/76.1 |
| 2015/0298258 A1* | 10/2015 | Arjakine | ................ | B05B 7/228 219/76.1 |

* cited by examiner

SMART ADDITIVE MANUFACTURING DEVICE

CROSS-REFERENCE TO RELATED APPLICATION

This application claims the benefit of priority of U.S. Provisional Patent Application 62/606,135, filed May 2, 2017 and titled "Direct Deposition Device" and of U.S. Provisional Patent Application 62/508,535, filed May 19, 2017 and titled "TriAx Direct Deposition Device," the disclosure of both of which are incorporated by reference.

STATEMENT REGARDING FEDERALLY SPONSORED RESEARCH OR DEVELOPMENT

Not Applicable

BACKGROUND OF THE INVENTION

Field of Invention

This invention relates generally to the field of manufacturing using additive manufacturing (AM) methods and, in particular, to a direct metal deposition (DMD) process utilizing a distributed laser light source to focus multiple laser beams on a build surface using laser-meltable metal feed material (wire or powder) to form a metal layered construct on a substrate under computer control.

Description of Related Art

Fabrication of three-dimensional metallic components using a layer-by-layer laser energy source deposition method was first reported in 1978 by Breinan and Kear. In 1982, U.S. Pat. No. 4,323,756 was issued to Brown et al., describing a method for the production of bulk, rapidly solidified metallic particles, with a particular application in the fabrication of certain gas turbine engine components including discs and knife-edge air seals. Such three-dimensional, laser-assisted metal deposition processes comprise a field of additive manufacturing (AM) termed Direct Metal Deposition (DMD).

Recently, various groups around the world have been working on different types of layered manufacturing techniques for fabrication of metallic components. Recent innovations include the integration of lasers with multi-axis computer numeric control (CNC) machines using a laser to focus a beam on the metal feed material through a DMD nozzle to fabricate a three-dimensional component. Computer Aided Design (CAD) and Computer Aided Manufacturing (CAM) software is integrated with the DMD process to drive the nozzle to fabricate precise three-dimensional component renderings. Previous approaches utilize a nozzle where the laser beam enters through the center of the nozzle with the metal feed material introduced through the nozzle via a coaxial or side feed mechanism. U.S. Pat. No. 7,765,022 introduced an approach utilizing this configuration using a diode laser source in 2010. Use of a diode laser source provides advantages by improving response times to power adjustments to precisely control the DMD process. In U.S. Pat. No. 7,765,022, a central diode laser system is combined with an optical monitor and a side-mounted powder/wire/tape delivery system. In this approach, either wire or powder feed material is used, but no capability is provided for use of wire or powder feed material within the same DMD nozzle. Facilitation of wire or powder feed material through a central axis in the same DMD nozzle combined with use of an array of off-axis, diode laser fibers or diode-pumped solid-state laser fibers to melt the feed material has not been presented.

SUMMARY OF THE INVENTION

Disclosed is a smart additive manufacturing device (SAMD) in a compact, direct metal deposition (DMD) 3-dimensional printing deposition head providing a unique method of delivering laser power, simultaneous wire and powder deposition, inline process controls, wire feed driver/precision control, and shield gas via the same deposition head. The SAMD deposition head provides a compact solution for DMD within multiple metal printing platforms, including use in custom print envelopes, CNC machines, robotic, and gantry systems. Other embodiments use a laser entering through the center of the deposition head, with the material (wire or powder) entering coaxially or from the side.

The Smart Additive Manufacturing Device (SAMD) deposition head features a metal deposition print head in a laser-assisted DMD process. The deposition head may be incorporated into additive, robotic, and combined additive and subtractive CNC manufacturing processes. The print envelope within which the SAMD deposition head operates is limited to a minimum size of the deposition head dimensions with maximum size limited to a user-defined print enclosure. This feature provides for 3D metal printing of large structures. The SAMD head may be operated in an air or inert atmosphere environment.

In some embodiments, the deposition material enters through the center axis of the head with laser energy from multiple lasers angled to coincide with the material feed and work-piece at a precise focal point. Multiple fiber-coupled diode laser or fiber-coupled diode-pumped solid-state lasers (DPSSLs) provide high effective laser power. The design features the wire and powder feed material in separate channels through a coax arrangement with precision monitoring and adjustment of material feeds. The design includes multiple internal channels providing for coolant, shield gas, powder flow, and wire feed. Shield gas is delivered to protect optical components and to blanket the build surface through an adjustable configuration. Process feedback controls provide for continual adjustment of process parameters to optimize deposition. A compact conduit encloses supply lines including coolant, feed material, and shield gas

DETAILED DESCRIPTION OF THE INVENTION

Figure 1:
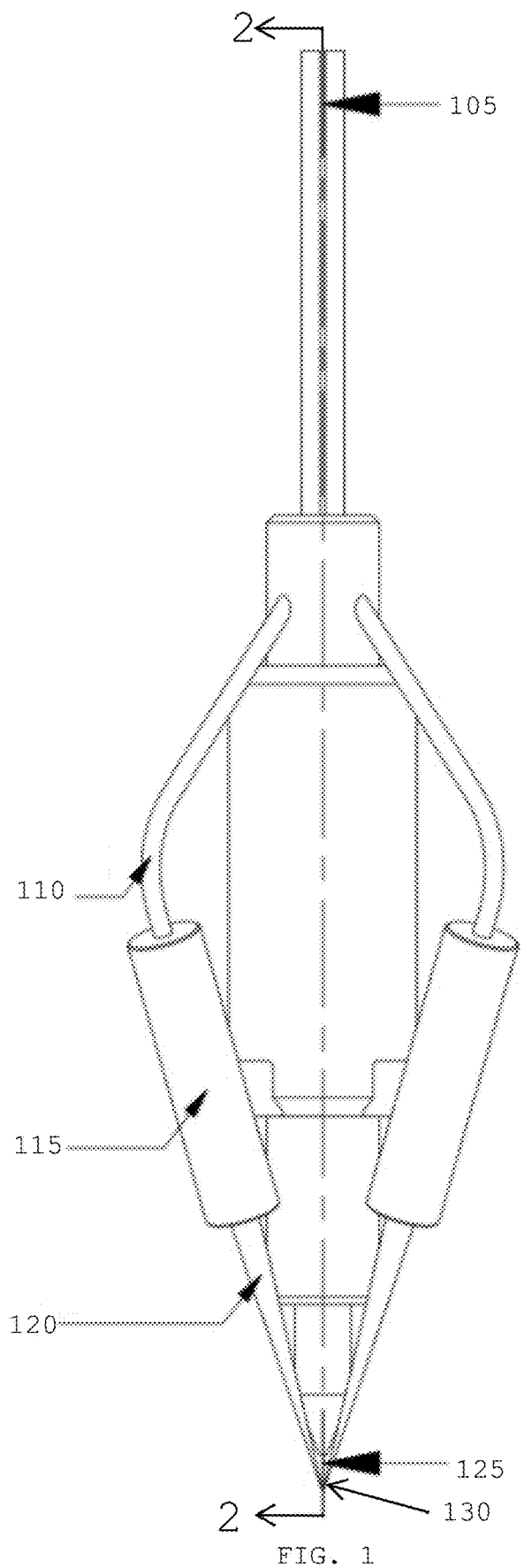
FIG. 1 shows a side view of an embodiment for a smart additive manufacturing device (deposition head) featuring its supply and laser fiber connections.

FIG. 1 shows a side view of an embodiment for a smart additive manufacturing device (deposition head) featuring its supply and laser fiber connections. Shown in FIG. 1 are a wire feed supply channel (105), a plurality of laser light fibers (110) emanating from a plurality of laser light sources, including but not exclusively, fiber-coupled diode lasers or fiber-coupled diode-pumped solid state lasers (DPSSLs), a plurality of off-axis laser light beams (120), a material feed (125), and a focal point for wire, powder and laser (130). Also shown are a plurality of off-axis laser light lens assemblies (115), which may be collimators in some embodiments, but are identified generically here as a plurality of off-axis laser light lens assemblies (115). Line 2-2 indicates that FIG. 2 is a cut-away view.

As shown in FIG. 1, a wire feed supply channel (105) supplies deposition feed stock such as wire though the deposition head. In some embodiments, the wire feed supply channel (105) is capable of supplying shield gas though the deposition head. Not shown in FIG. 1 is the concurrent supply and feed of metal powder. The deposition feed stock emerges as a material feed (125) towards a focal point for wire, powder and laser (130).

Concurrently, a plurality of laser fibers (110) emanating from laser light sources, including but not exclusively, fiber-coupled diode lasers or DPSSLs, deliver light to a plurality of off-axis laser light lens assemblies (115), which produce a plurality of off-axis laser light beams (120), which are directed towards the focal point for wire, powder and laser (130).

Figure 2:
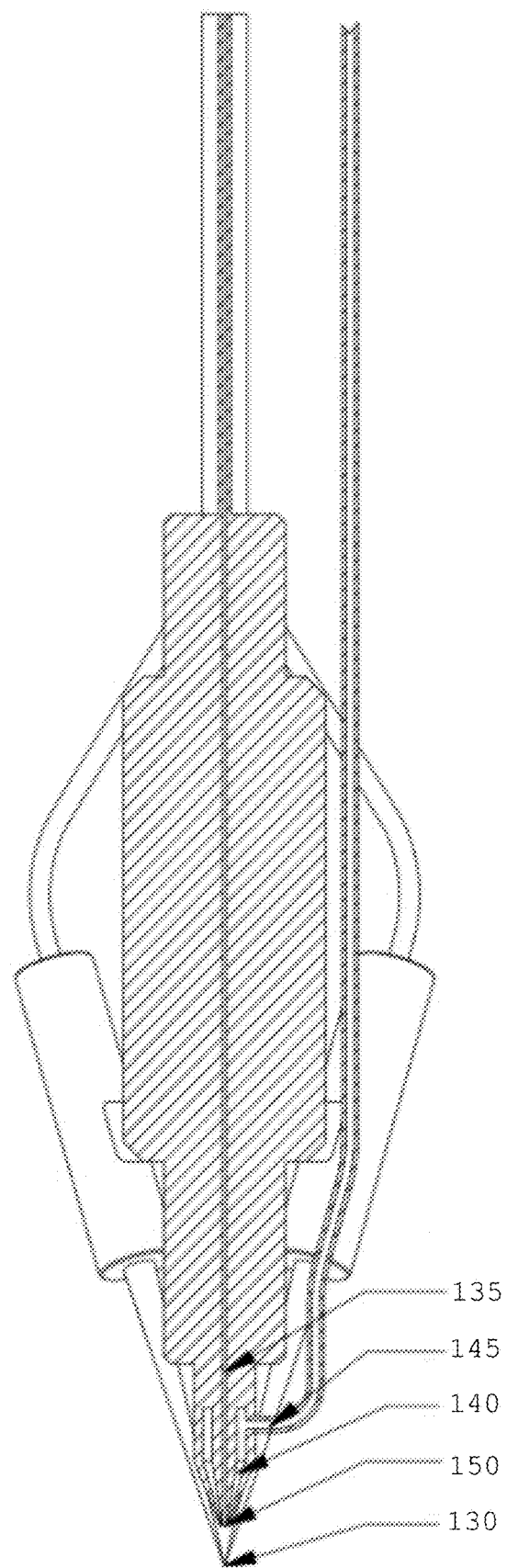
FIG. 2 shows a cut-away side view of an embodiment in principle of a smart additive manufacturing device (deposition head) featuring its supply and laser fiber connections.

FIG. 2 shows a cut-away side view of an embodiment in principle of a smart additive manufacturing device (deposition head) featuring its supply and laser fiber connections. In addition to being a cut-away view, FIG. 2 shows additional features from FIG. 1.

Shown in FIG. 2 are a central axis wire feed guide tube (135), a co-axial powder supply annulus (140), co-axial powder supply shield gas channel (145), a central deposition nozzle (150) and the focal point for wire, powder and laser (130). This focal point constitutes the laser interaction zone. The co-axial powder supply annulus (140) provides for delivery of powder.

In some embodiments, the co-axial powder supply annulus (140) operates as part of a shield gas delivery system to supply shield gas or serves to concurrently delivery of powder and shield gas and thus may be known as a co-axial powder supply shield gas channel (145). The central deposition nozzle (150) provides for delivery of wire from the central axis wire feed guide tube (135).

Figure 3:
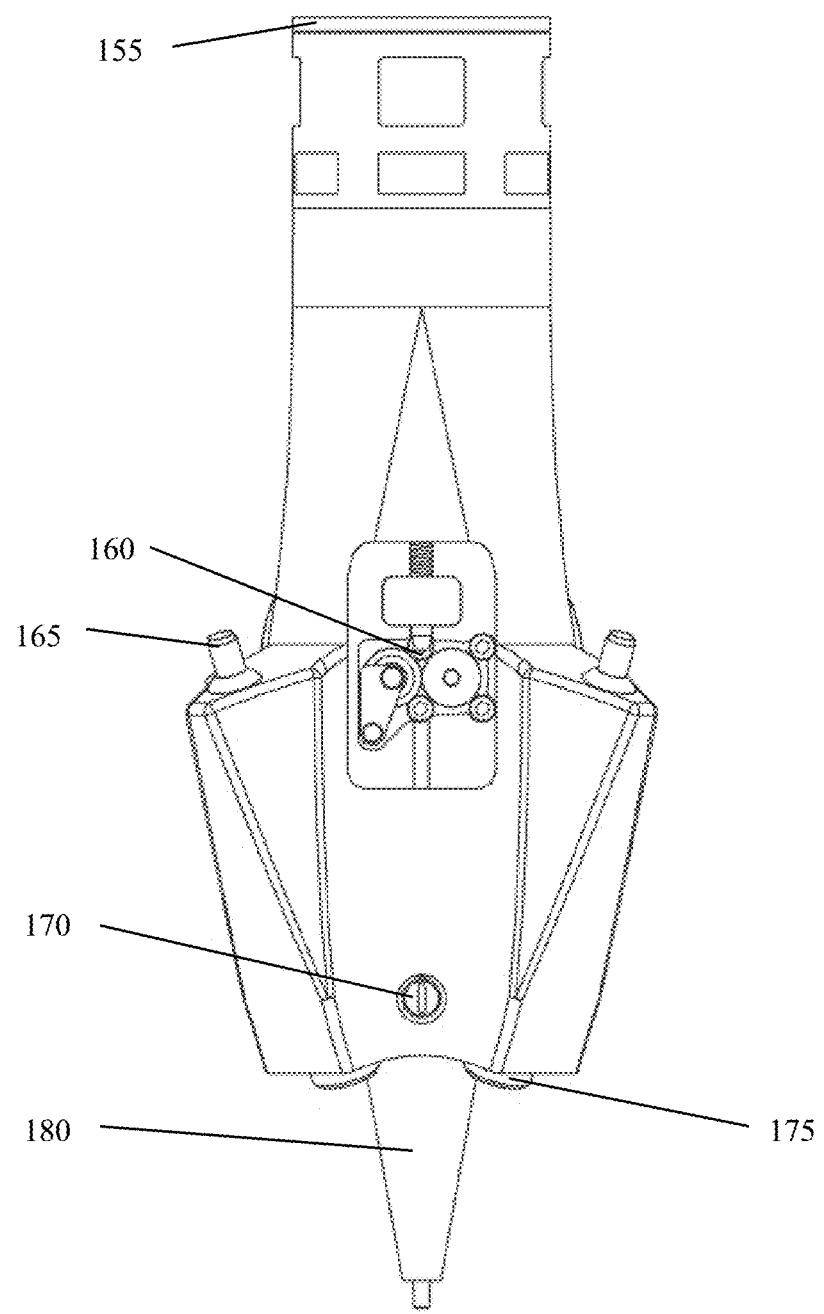
FIG. 3 shows a front view of an embodiment of a smart additive manufacturing device featuring the supply and laser fiber connections and inline control, and a plurality of laser light fibers (110) emanating from a plurality of laser light sources, including but not exclusively, fiber-coupled diode laser or fiber-coupled diode-pumped solid state laser (DPSSL) array configured to deliver high-effective power to a precisely-oriented focal point comprising the energy source of the DMD process.

FIG. 3 shows a front external view of an embodiment of a smart additive manufacturing device featuring the supply and laser fiber connections and inline control, and a plurality of laser light fibers (110) emanating from a plurality of laser light sources, including but not exclusively, fiber-coupled diode lasers or fiber-coupled diode-pumped solid state lasers (DPSSL) array configured to deliver high-effective power to a precisely-oriented focal point comprising the energy source of the DMD process. The SAMD deposition head consists of a dual mode nozzle (wire and/or powder), multiple laser fiber supply inputs, wire driver/controller, powder supply inputs, shield gas supply input, shield gas diffuser, and deposition nozzle micrometer scale control.

Shown in FIG. 3 are a deposition head housing with supply lines conduit interface (155), an integrated wire pull system with automatic feed pressure control (160), a plurality of off-axis laser fiber couplings (165), an integrated x/y micrometer nozzle adjustment (170), a plurality of off-axis laser beam apertures (175), and a concurrent deposition housing (180).

For ease of discussion, the portion from the deposition head housing with supply lines conduit interface (155) to the plurality of off-axis laser beam apertures (175) may be known as the deposition head housing (thus excluding the concurrent deposition housing). The deposition head housing with supply lines conduit interface (155) provides for attachment of supply lines as well as structure and protection of the delivery components of the deposition head for supply of wire and powder (a.k.a. feed stock) and shield gas to the concurrent deposition housing (180).

The integrated wire pull system with automatic feed pressure control (160) serves as a control mechanism for pulling deposition wire from the wire supply spool (which may be within an integrated wire pull system) and delivering deposition wire to the concurrent deposition housing (180).

The plurality of off-axis laser fiber couplings (165) provides for secure coupling of the plurality of laser light fibers (110) emanating from a plurality of laser light sources, including but not exclusively, fiber-coupled diode lasers or fiber-coupled DPSSLs and delivery of light to the plurality of off-axis laser light lens assemblies (115 in FIG. 1). The plurality of off-axis laser light lens assemblies (115) deliver laser light from the plurality of off-axis laser beam apertures (175) to the focal point for wire, powder and laser (130) below the concurrent deposition housing (180). In some embodiments, the plurality of off-axis laser light lens assemblies (115) are off-axis 1 to 25 degrees. In some embodiments, the plurality of off-axis laser light lens assemblies (115) are off-axis 25 to 35 degrees. In some embodiments, the plurality of off-axis laser light lens assemblies (115) are off-axis 35 to 50 degrees. In some embodiments, the plurality of off-axis laser light lens assemblies (115) are off-axis 30 degrees. The angular variation depends on managing reflection to reduce probability of specular reflection (either back reflection or reflection into another laser lens/fiber assembly) which could damage the lens and the fiber tip.

The integrated x/y micrometer nozzle adjustment (170) provides for micrometer-scale adjustments of the nozzle for precise delivery of wire and powder to the work surface and sets alignment of the plurality of off-axis laser beam apertures (175) with the concurrent deposition housing (180).

The plurality of off-axis laser beam apertures (175) mitigates external factors from interfering with the quality of the laser light delivered to the deposition surface.

Figure 5:
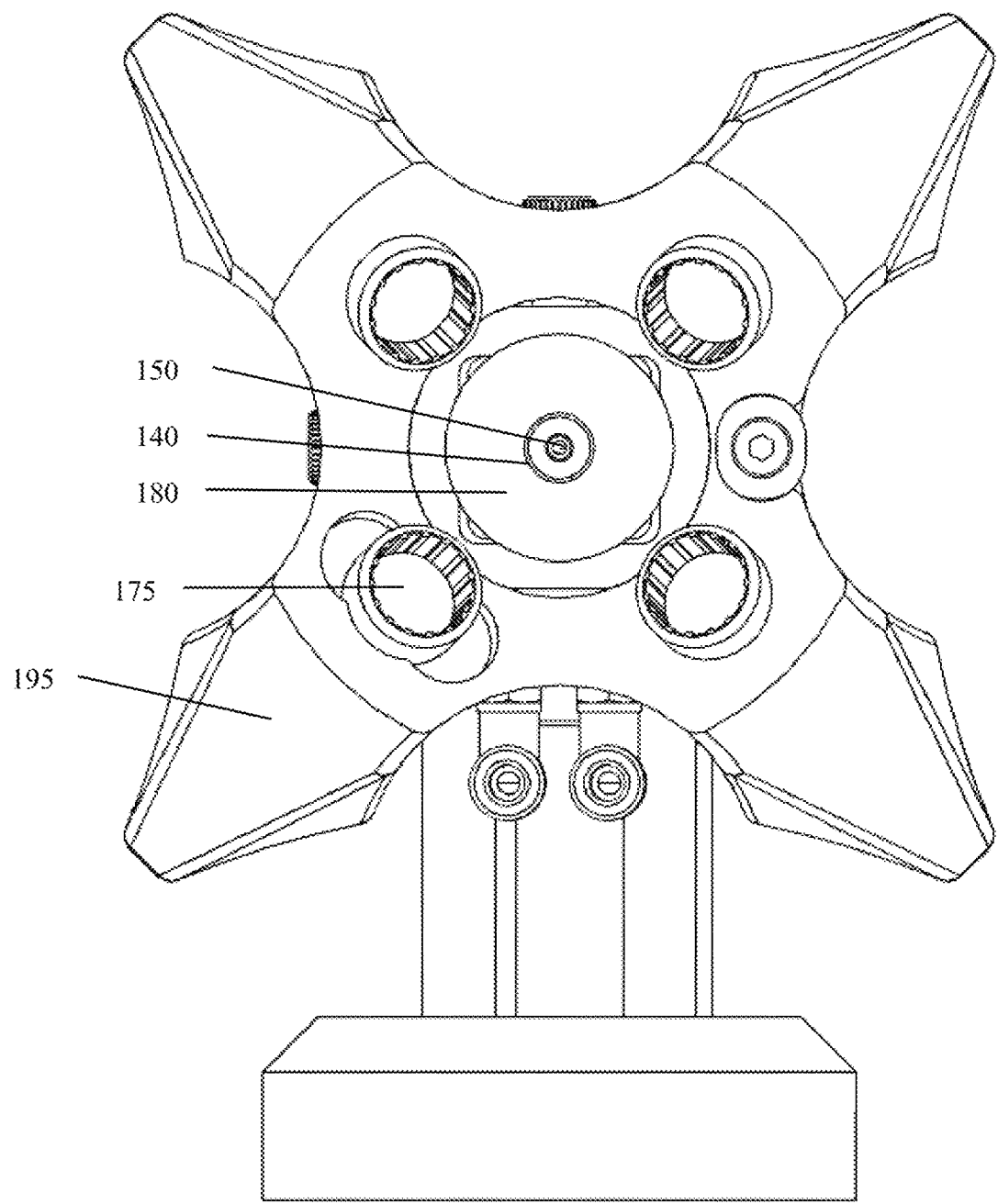
FIG. 5 shows a bottom view of an embodiment of a smart additive manufacturing device featuring the underside of the deposition head.

The concurrent deposition housing (180) houses lower portions of the central axis wire feed guide tube (135) and the co-axial powder supply annulus (140), and the central deposition nozzle (150). Precise concurrent control provides for precise concurrent delivery of feed stock wire through the central deposition nozzle (150) and powder to the deposition surface, i.e., the substrate and work surface. In some embodiments, the central deposition nozzle (150) is centrally located at the bottom of the concurrent deposition housing (180). FIG. 5 shows another view of these structures.

Figure 4:
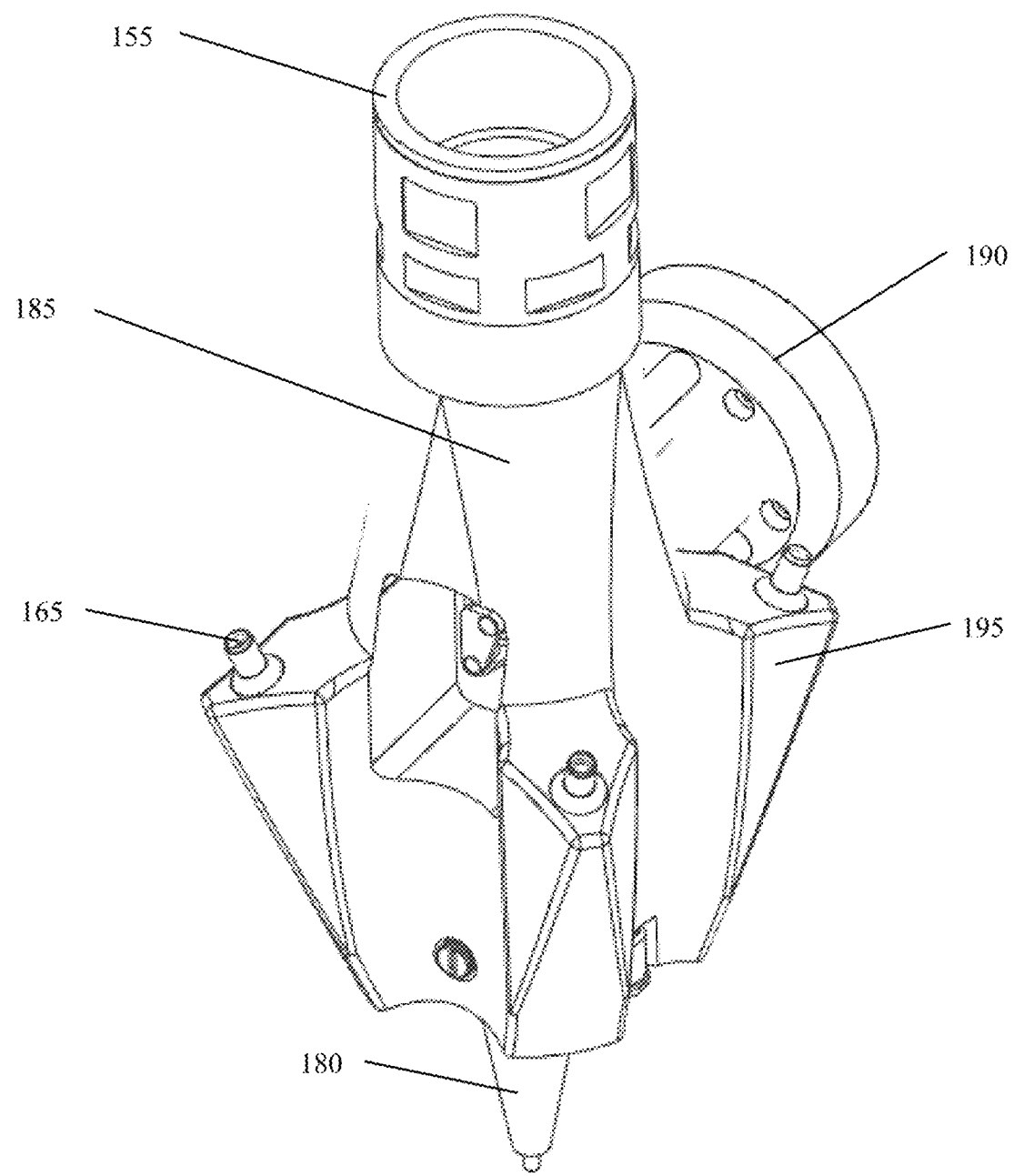
FIG. 4 shows a perspective view of an embodiment of a smart additive manufacturing device featuring a head mounting structure (190).

FIG. 4 shows a perspective view of an embodiment of a smart additive manufacturing device. Shown in FIG. 4 are the deposition head housing with supply lines conduit interface (155), a deposition head supply neck (185), a head mounting structure (190), and a plurality of lens assembly casements (195). The deposition head supply neck (185) provides a stable structure and spacing for mounting supply lines, channels and the integrated wire pull system with automatic feed pressure control (160) (FIGS. 1, 2 and 3) between the deposition head housing with supply lines conduit interface (155) and the concurrent deposition housing (180). In addition, the deposition head supply neck (185) provides a stable structure for proper support and alignment of the plurality of off-axis laser fiber couplings (165) connected to the plurality of off-axis laser light lens assemblies (115) for producing off-axis laser light beams (120). The head mounting structure (190) provides for mounting the deposition head housing within a print enclosure, robotic system, gantry system, or computer numeric control system. The plurality of lens assembly casements (195) provides structure and support for lens assemblies and each of the plurality of off-axis laser fiber couplings (165) for connection of the plurality of laser light fibers (110) emanating from a plurality of laser light sources, including but not exclusively, fiber-coupled diode lasers or fiber-coupled DPSSLs.

FIG. 5 shows a bottom view of an embodiment of a smart additive manufacturing device featuring the underside of the deposition head.

Shown in FIG. 5 are the co-axial powder supply annulus (140), the central deposition nozzle (150), the concurrent deposition housing (180), the plurality of lens assembly casements (195) and the plurality of off-axis laser beam apertures (175).

The smart additive manufacturing device features on-axis dual mode capability in the concurrent deposition housing (180) to deliver metal wire via the central deposition nozzle (150) or metal powder via the co-axial powder supply annulus (140) or both at the same time for DMD printing. The smart additive manufacturing device overcomes limitation of other printing heads (nozzles) which provide for a single material type (e.g., wire or powder, but not both) during the same print cycle. This limitation is typically due to spatial difficulties presented by on-axis laser energy delivery and feeding in multiple material types coaxially or from the side. The smart additive manufacturing device overcomes this problem by employing off-axis laser energy delivery and routing the material through the center axis of the concurrent deposition housing (180) using a coaxial configuration with wire residing in the central axis wire feed guide tube (135) and powder flowing through a co-axial powder supply annulus (140). The off-axis laser beam lens system is protected by a plurality of lens assembly casements (195) with laser light emitted from a plurality of off-axis laser beam apertures (175) onto a build surface.

This configuration allows for two or more lasers. Some configurations may use lasers of different wavelengths and power. In some embodiments, the plurality of laser light sources emit laser light of an infrared spectrum light at a wavelength of 700 nm to 1 mm. In some embodiments, the plurality of laser light sources emit laser light of a visible spectrum light at a wavelengths of 400 to 700 nm. In some embodiments, the plurality of laser light sources emit laser light of an ultraviolet spectrum light at a wavelength of 180 to 400 nm. Other wavelengths may be used as suitable to the feed materials.

In some embodiments, co-axial powder supply annulus (140) also serves as a co-axial powder supply shield gas channel (145) for concurrent delivery of metal powder and shield gas. In other embodiments, the co-axial supply channel serves as the shield gas annulus to protect optical components. This is when the powder is not flowing, and only wire deposition is being performed.

Figure 6:
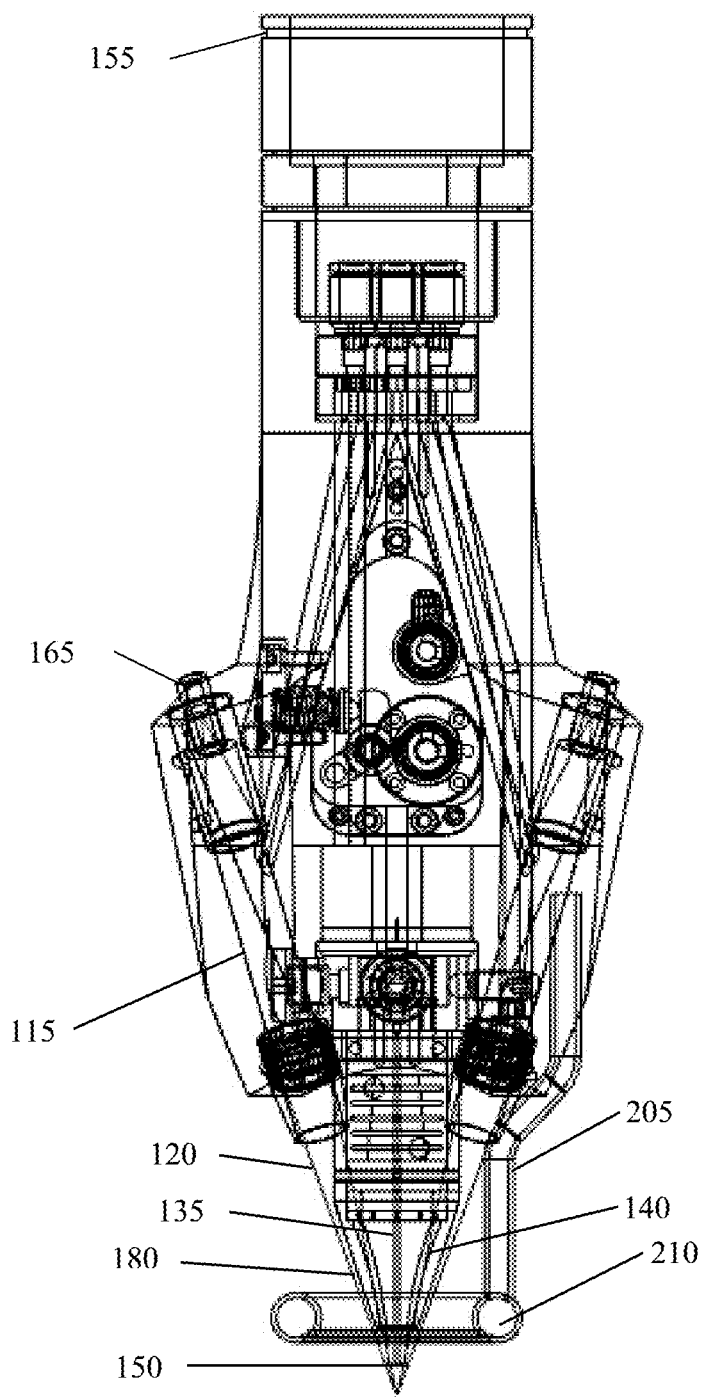
FIG. 6 shows a front section (internal) view of an embodiment of a smart additive manufacturing device including internal supply channels and a detachable and variable-shape shield gas diffuser.

FIG. 6 shows a front section (internal) view of an embodiment of a smart additive manufacturing device including internal supply channels and a detachable and variable-shape shield gas diffuser.

Shown in FIG. 6 are the central deposition nozzle (150), the deposition head housing with supply lines conduit interface (155), the plurality of off-axis laser fiber couplings (165), an at least one shield gas and coolant supply line (205), a central axis wire feed guide tube (135), a co-axial powder supply annulus (140), a shield gas diffuser (210), a concurrent deposition housing (180), a plurality of off-axis laser light lens assemblies (115) and the plurality of off-axis laser light beams (120).

In some embodiments, coolant channels are internal to the device representative of the internal lines shown in FIG. 6. In concert with or in lieu of the shield gas delivery system, an at least one shield gas and coolant supply line (205) is a shield gas flow tube in this embodiment. Note that shield gas also flows through internal channels to protect optical components. The shield gas diffuser does not protect optical components, it covers the build surface to eliminate oxidation effects when used in an air environment. The coolant may be a liquid fluid. The liquid fluid may be water.

Figure 7:
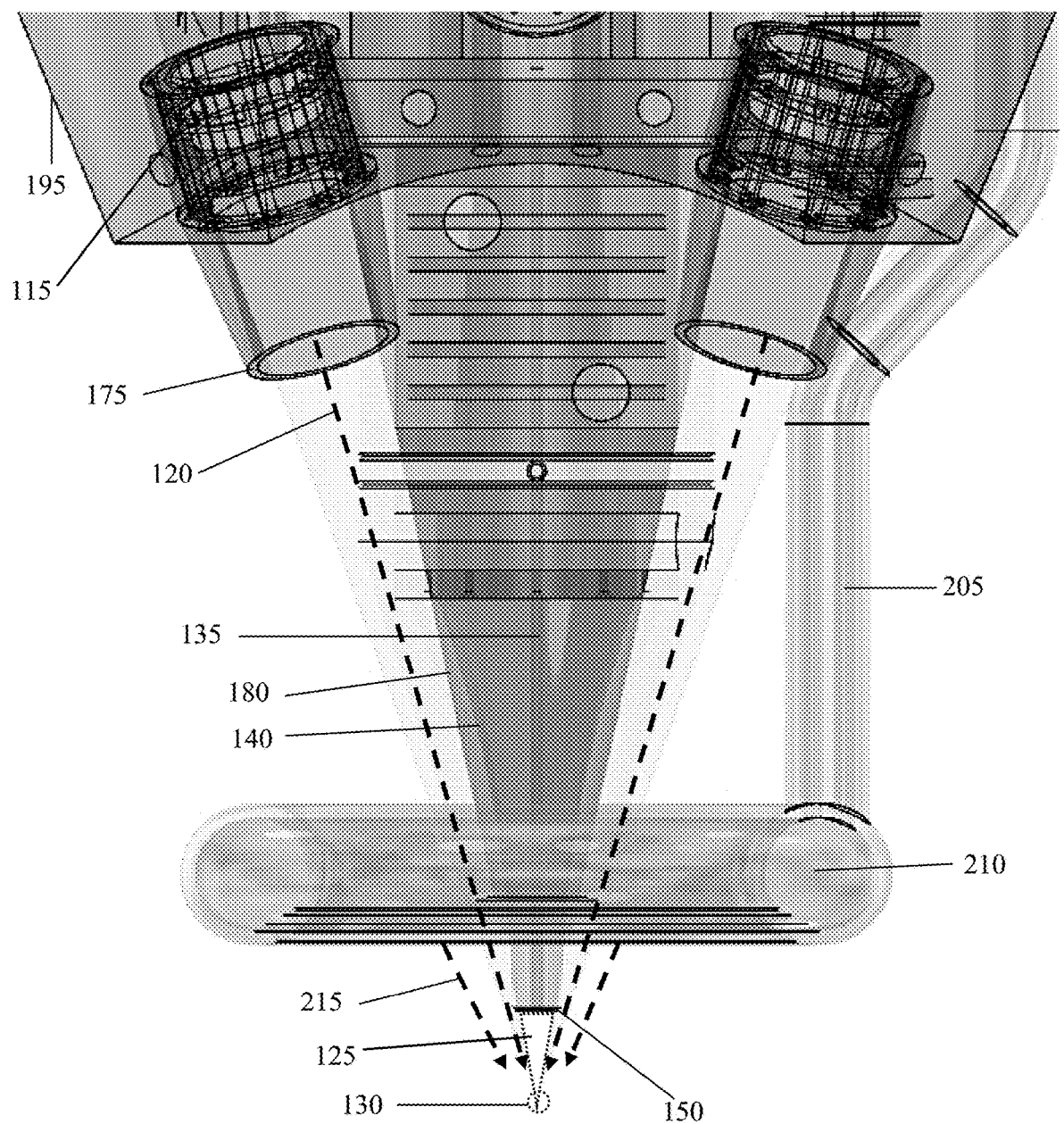
FIG. 7 shows a front cut-away (section) view of a concurrent deposition housing and deposition region of an embodiment of a smart additive manufacturing device featuring laser focusing, detachable shield gas diffuser, and wire deposition.

FIG. 7 shows a front cutaway (section) view of the concurrent deposition housing and deposition region of an embodiment of a smart additive manufacturing device featuring laser focusing, detachable shield gas diffuser, and wire deposition.

Shown in FIG. 7 are the concurrent deposition housing (180), the central axis wire feed guide tube (135) inside the concurrent deposition housing (180), the co-axial powder supply annulus (140) inside the concurrent deposition housing (180), the plurality of off-axis laser beam apertures (175), the plurality of lens assembly casements (195), a plurality of off-axis laser light lens assemblies (115), the plurality of off-axis laser light beams (120) from the plurality of off-axis laser light lens assemblies (115), an at least one shield gas and coolant supply line (205), a shield gas diffuser (210), a shield gas diffusion (215), a central deposition nozzle (150), a material feed (125) below the central deposition nozzle (150) and the focal point for wire, powder and laser (130).

As shown in FIG. 1, laser energy from the plurality of laser light fibers (110) emanating from a plurality of laser light sources, including but not exclusively, fiber-coupled diode lasers or fiber-coupled DPSSLs is directed through the plurality of off-axis laser light lens assemblies (115) for producing laser light into a plurality of off-axis laser light beams (120).

Concurrently a feed stock of metal wire, metal powder or both is supplied from their respective sources, i.e., the integrated wire pull system with automatic feed pressure control (160) supplies metal wire into the central axis wire feed guide tube (135) and to the central deposition nozzle (150), while the co-axial powder supply annulus (140) supplies metal powder to the central deposition nozzle (150), or both occur concurrently such that metal wire, metal powder or both are concurrently fed into a material feed (125) and arrive at the focal point for wire, powder and laser (130).

Meanwhile, the at least one shield gas and coolant supply line (205) provides shield gas to the co-axial powder supply shield gas channel (145) or the shield gas diffuser (210) as appropriate to generate a shield gas diffusion (215) to the build surface. Interchangeable diffusers of varying geometries best suited for specified build geometries are used. Proper supply and dispersion patterns of the shield gas diffusion (215) ensure sufficient residence time to protect the build surface from oxidation effects.

The plurality of off-axis laser light beams (120) concentrate laser energy onto a focal point for wire, powder and laser (130) to form a melt pool, resulting in a layer-by-layer build-up of a metal construct of user-specified configuration and dimension. User-defined process parameters (e.g., deposition velocity, laser power, and wire/powder feed rate) are input into a customized computer process as control signals to drive the deposition process. Automated features, including wire pressure control, provide variable inputs to optimize deposition quality.

In some embodiments, laser power may range from 800 watts (four 200-watt fiber-coupled diode lasers) to 24 kW (e.g., eight fiber-coupled DPSSLs). An 800-watt configuration may provide for a 200 mm/min deposition rate at 630 watts with a wire material feed at about 325 mm/min (for Inconel-718—feed rate varies some with print configuration). Material feed and deposition rates also change with the print material for a given laser power.

Material gradients and material blending can be accomplished through powder flow onto a wire matrix, which are fully mixed within the melt pool driving individual deposition layers and tracks.

This configuration permits feeding the feed material comprising a metal powder from a co-axial powder supply annulus (140) and a metal wire from a central axis wire feed guide tube (135) concurrently through the concurrent deposition housing (180) and depositing the feed material as a homogenous metal, semi-circular bead.

Figure 8:
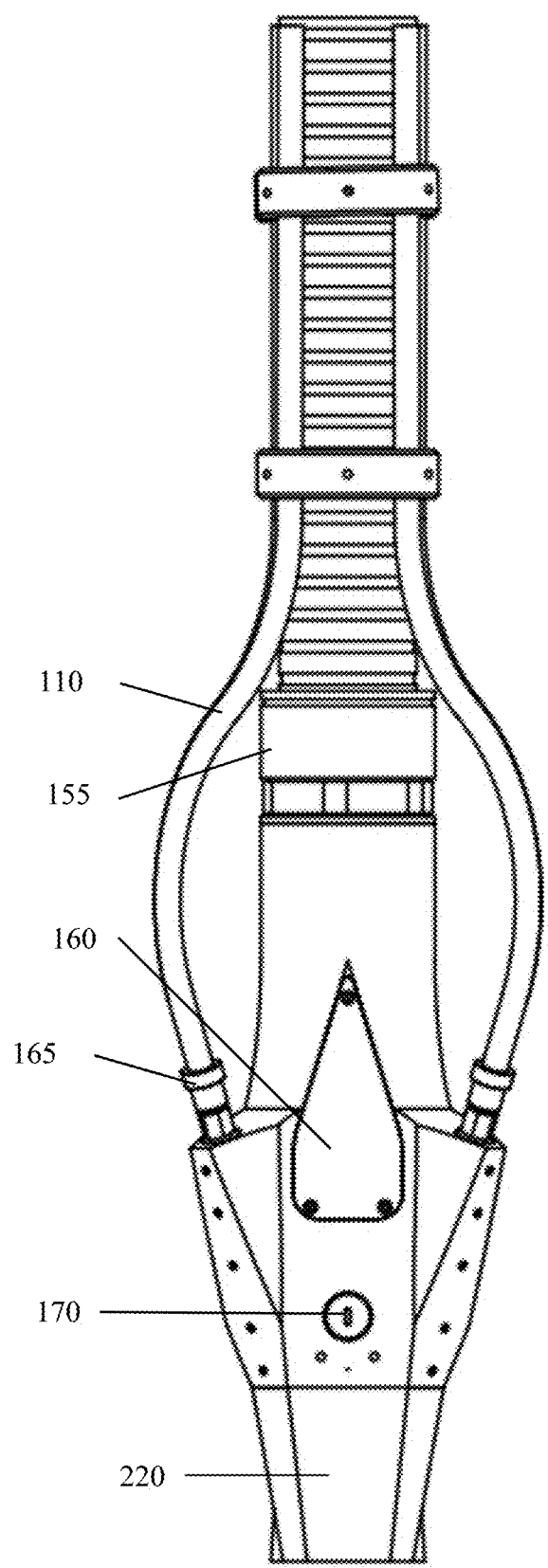
FIG. 8 shows a front view of an embodiment of a smart additive manufacturing device (deposition head) with an integrated shield gas diffuser cowling (220).

FIG. 8 shows a front view of an embodiment of a smart additive manufacturing device (deposition head) with an integrated shield gas diffuser cowling (220). Shown in FIG. 9 are a plurality of laser fibers (110) emanating from a plurality of laser light sources, including but not exclusively, fiber-coupled diode lasers and fiber-coupled DPSSLs, a deposition head housing with supply lines conduit interface (155), an integrated wire pull system with automatic feed pressure control (160), a plurality of off-axis laser fiber couplings (165), an integrated x/y micrometer nozzle adjustment (170) and an integrated shield gas diffuser cowling (220).

Figure 9:
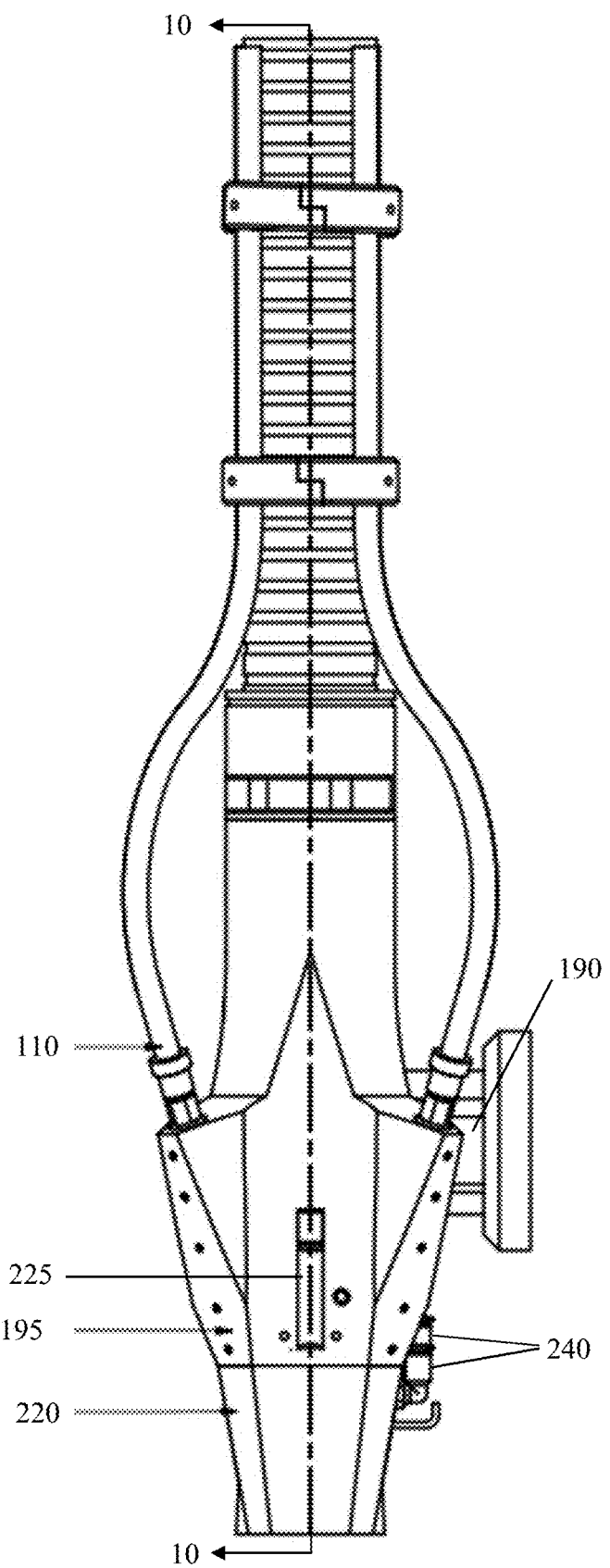
FIG. 9 shows a side view of an embodiment of a smart additive manufacturing device (deposition head) with an integrated shield gas diffuser cowling (220), shield gas coupler (225), head mounting structure (190), and water cooling line fittings.

FIG. 9 shows a side view of an embodiment of a smart additive manufacturing device (deposition head) with an integrated shield gas diffuser cowling (220), a shield gas coupler (225), head mounting structure (190), and water cooling line fittings (240).

In this embodiment, the shield gas coupler (225) provides for coupling of shield gas to the deposition head at an external and readily available location. This embodiment also shows an integrated shield gas diffuser cowling (220) which may be used in some embodiments, as elaborated in FIG. 11, as an alternative to an external shield gas supply and diffusion as shown in FIG. 7. Line 10-10 indicates that FIG. 10 is a cut-away view.

Also shown in FIG. 9 are a plurality of water cooling line fittings (240). The plurality of water cooling line fittings (240) provide an inlet and exit for cooling water to maintain the deposition head at operational temperature. FIG. 10 shows additional details of the water cooling system.

Figure 10:
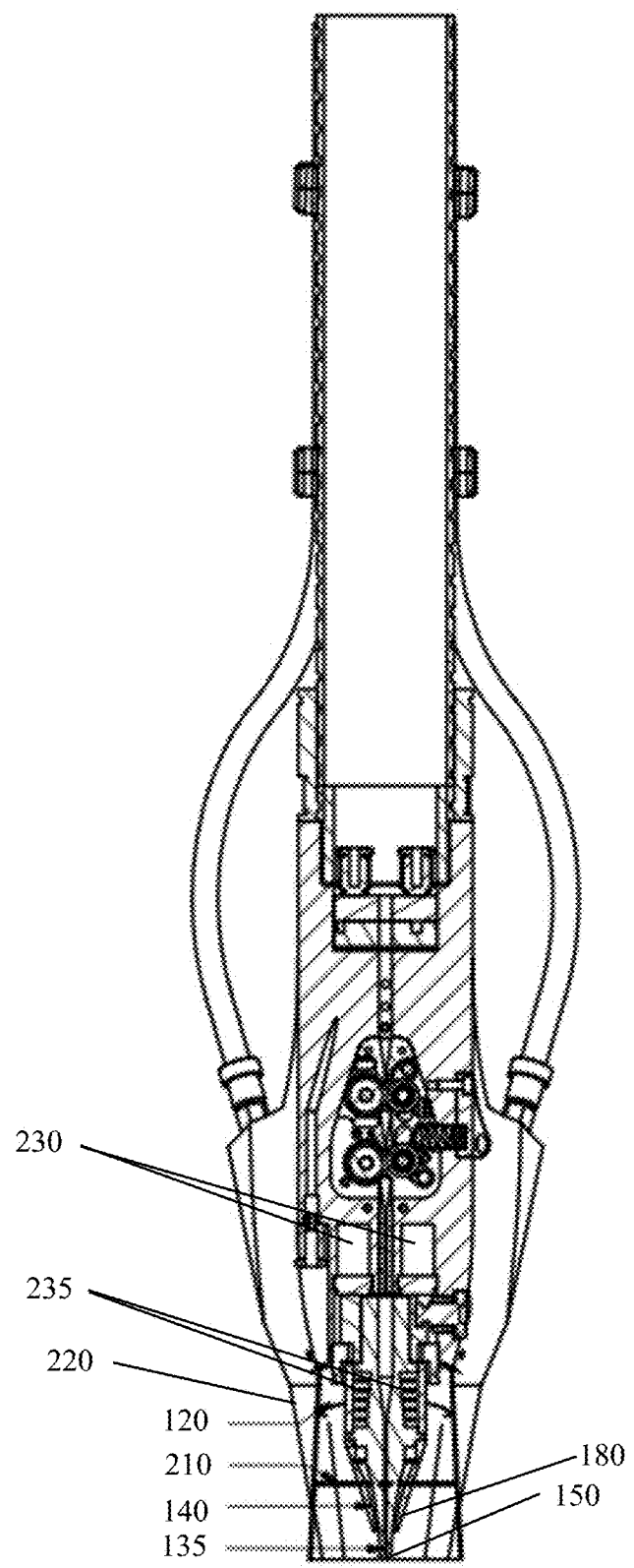
FIG. 10 shows a side section (internal) view of an embodiment of a smart additive manufacturing device (deposition head) with an integrated shield gas diffuser cowling (220).

FIG. 10 shows a side section (internal) view of an embodiment of a smart additive manufacturing device (deposition head) with an integrated shield gas diffuser cowling (220). Shown in FIG. 10 are a plurality of off-axis laser light beams (120), a central axis wire feed guide tube (135), a co-axial powder supply annulus (140), a central deposition nozzle (150), a concurrent deposition housing (180), a shield gas diffuser (210) inside an integrated shield gas diffuser cowling (220), a plurality of head cooling channels (230) and a plurality of nozzle cooling channels (235).

As shown in FIG. 10, the shield gas diffuser (210) lies inside an integrated shield gas diffuser cowling (220), around the concurrent deposition housing (180) and above the nozzle. In this configuration the shield gas diffuser (210) serves to partially contain shield gas coolant emitting from the optics to around the concurrent deposition housing (180) and diffuse the shield gas onto the deposition surface and mitigate oxidation.

The plurality of head cooling channels (230) provide for keeping the deposition head above the central deposition nozzle (150) at operational temperature while the plurality of nozzle cooling channels (235) provide additional cooling for keeping the central deposition nozzle (150) at operational temperature.

Figure 11:
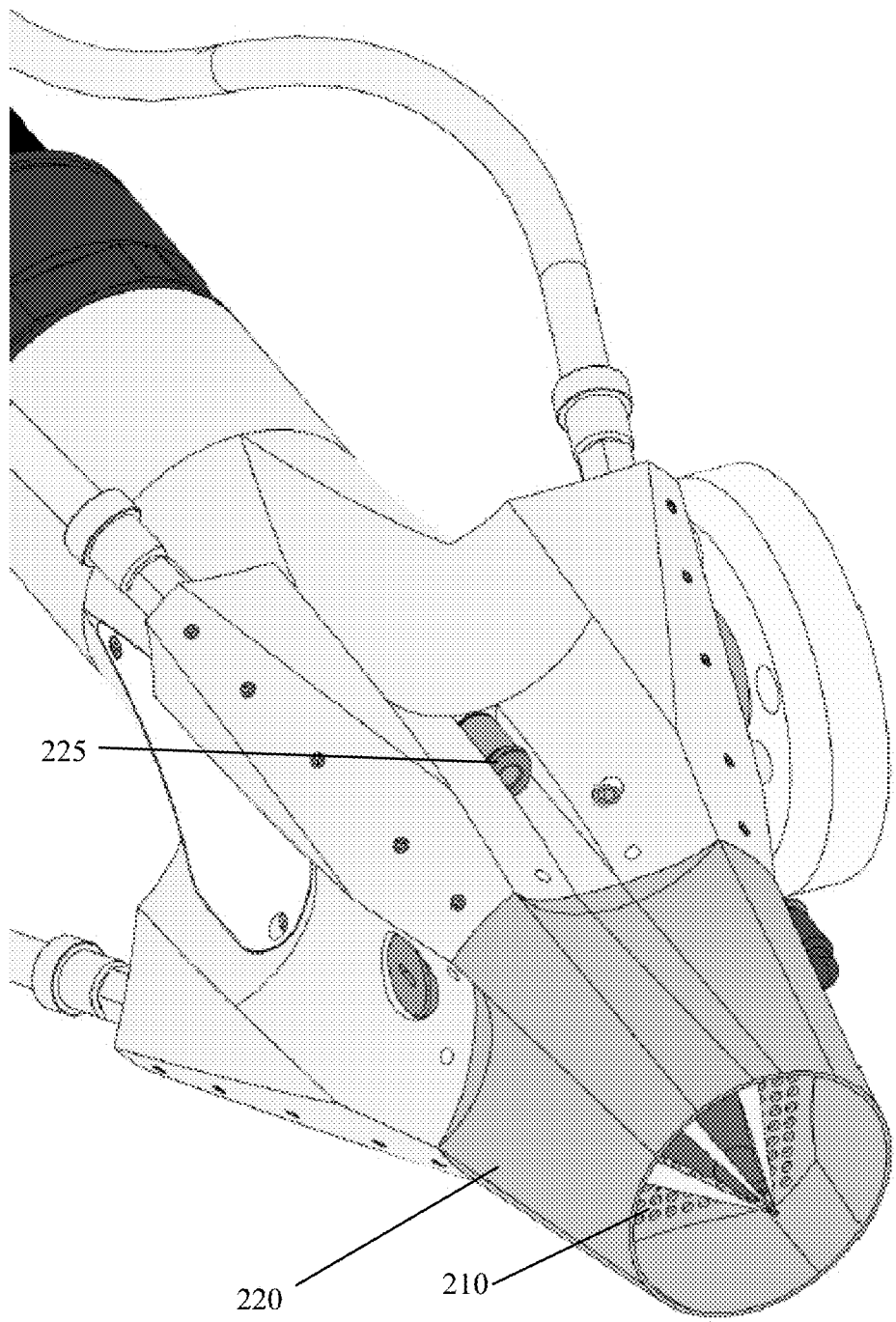
FIG. 11 shows a perspective view of an embodiment of a smart additive manufacturing device (deposition head) with a variation of the shield gas diffuser.

FIG. 11 shows a perspective view of an embodiment of a smart additive manufacturing device (deposition head) with a variation of the shield gas diffuser. Shown in FIG. 11 are a shield gas diffuser (210), an integrated shield gas diffuser cowling (220) and a shield gas coupler (225). The shield gas diffuser (210) is integrated into the integrated shield gas diffuser cowling (220) to produce a shield gas diffusion (not shown) which optimally protects the build surface.

Figure 12:
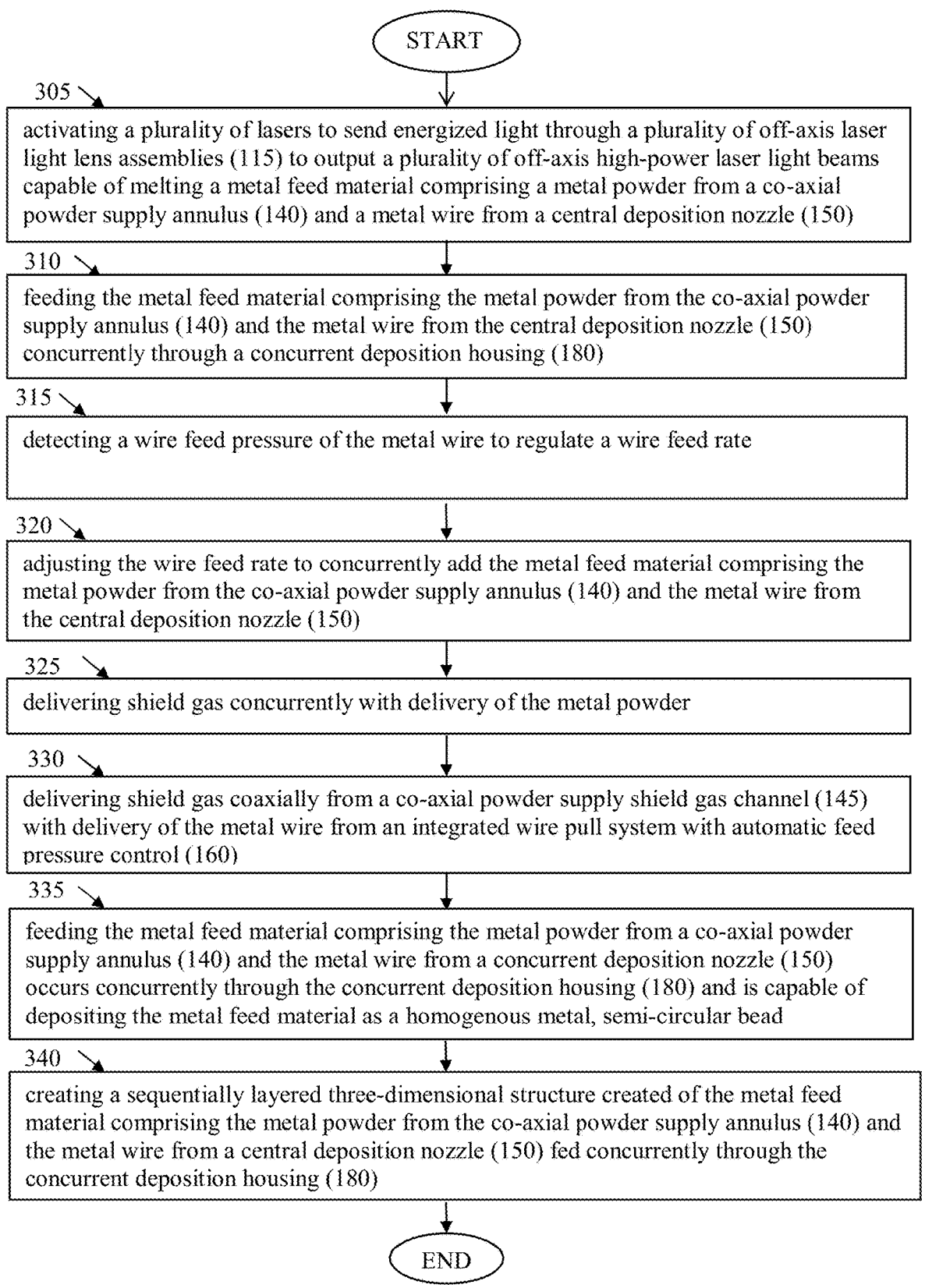
FIG. 12 shows a method for concurrent deposition of metal wire and metal powder through the same deposition head with a plurality of off-axis laser light beams (120).

FIG. 12 shows a method for concurrent deposition of metal wire and metal powder through the same deposition head with a plurality of off-axis laser light beams (120).

At step 305, activating a plurality of lasers to send energized light through a plurality of off-axis laser light lens assemblies to output a plurality of off-axis high-power laser light beams capable of melting a metal feed material comprising a metal powder from a co-axial powder supply annulus (140) and a metal wire from a central deposition nozzle (150). At this step, a small portion of feed material (wire, powder or both) is melted into a melt pool.

At step 310, feeding the metal feed material comprising the metal powder from the co-axial powder supply annulus (140) and the metal wire from the central deposition nozzle (150) concurrently through the concurrent deposition housing (180). At this step, additional feed material is fed to the melt pool.

At step 315, detecting a wire feed pressure of the metal wire to regulate a wire feed rate. At this step, sensors in the integrated wire pull system with automatic feed pressure control (160) detect the wire pressure as the wire melts in the melt pool.

At step 320, adjusting the wire feed rate to concurrently add the metal feed material comprising the metal powder from the co-axial powder supply annulus (140) and the metal wire from the central deposition nozzle (150). At this step, the integrated wire pull system with automatic feed pressure control (160) adjusts the feed rate of the wire pressure to provide an appropriate feed rate of metal wire to match the heat of the lasers so the melt pool takes on a three-dimensional characteristic.

Step 325 may include delivering shield gas concurrently with delivery of the metal powder.

Step 330 may include delivering shield gas coaxially from a co-axial powder supply shield gas channel (145) with delivery of the metal wire from the integrated wire pull system with automatic feed pressure control (160).

Step 335 may include feeding the metal feed material comprising the metal powder from a co-axial powder supply annulus (140) and the metal wire from the central deposition nozzle (150) occurs concurrently through the concurrent deposition housing (180) and is capable of depositing the metal feed material as a homogenous metal, semi-circular bead.

Step 340 may include creating a sequentially layered three-dimensional structure created of the metal feed material comprising the metal powder from the co-axial powder supply annulus (140) and the metal wire from the central deposition nozzle (150) fed concurrently through the concurrent deposition housing (180).

These descriptions and drawings are embodiments and teachings of the disclosure. All variations are within the spirit and scope of the disclosure. This disclosure is not to be considered as limiting the claims to only the embodiments illustrated or discussed. Certain changes can be made in the subject matter without departing from the spirit and the scope of this invention. Changes are possible within the scope of this invention. Each structure or element recited in any claim also refers to all equivalent structures or elements. The following claims are intended to cover the invention as broadly as possible in whatever form it may be used.

What is claimed is:

1. A smart additive manufacturing device comprising:
   a co-axial powder supply annulus (140) capable of delivering a metal powder through a concurrent deposition housing (180) to a focal point for wire, powder and laser (130),
   an integrated wire pull system with automatic feed pressure control (160) capable of delivering a metal wire from a central axis wire feed guide tube (135) through a central deposition nozzle (150) in the concurrent deposition housing (180) to the focal point for wire, powder and laser (130),
   an integrated x/y micrometer nozzle adjustment (170) capable of micrometer scale control of the concurrent deposition housing (180),
   a plurality of laser light fibers (110) emanating from a plurality of laser light sources for delivering laser light to,
   a plurality of off-axis laser light lens assemblies (115) for producing a plurality of off-axis laser light beams (120) directed to the focal point for wire, powder and laser (130), wherein
   delivery of the metal powder to the focal point for wire, powder and laser (130) occurs concurrently with delivery of the wire through the concurrent deposition housing (180) to the focal point for wire, powder and laser (130) and concurrently with the plurality of off-axis laser light beams (120) to the focal point for wire, powder and laser (130).

2. The smart additive manufacturing device of claim 1 wherein the plurality of laser light sources comprise a plurality of fiber-coupled diode lasers.

3. The smart additive manufacturing device of claim 1 wherein the plurality of laser light sources comprise a plurality of fiber-coupled diode-pumped solid-state lasers.

4. The smart additive manufacturing device of claim 1 further comprising a plurality of off-axis laser beam apertures (175) capable of directing the plurality of off-axis laser light beams (120).

5. The smart additive manufacturing device of claim 1 further comprising a shield gas delivery system capable of delivering shield gas to the focal point for wire, powder and laser (130) concurrently with delivery of the metal powder from the central deposition nozzle (150).

6. The smart additive manufacturing device of claim 1 further comprising a shield gas delivery system capable of delivering shield gas to the focal point for wire, powder and laser (130) coaxially with delivery of the wire from the integrated wire pull system with automatic feed pressure control (160).

7. The smart additive manufacturing device of claim 1 wherein the plurality of laser light sources emit laser light of an infrared spectrum light.

8. The smart additive manufacturing device of claim 1 wherein the plurality of laser light sources emit laser light of a visible spectrum light.

9. The smart additive manufacturing device of claim 1 wherein the plurality of laser light sources emit laser light of an ultraviolet spectrum light.

10. The smart additive manufacturing device of claim 1 further comprising
    a shield gas delivery system capable of delivering a shield gas concurrently with delivery of the metal wire from the central deposition nozzle (150),
    a shield gas delivery system capable of delivering a shield gas concurrently with delivery of the metal powder from the co-axial powder supply annulus (140), wherein
    delivery of the shield gas concurrently with delivery of the metal wire from the central deposition nozzle (150) occurs concurrently with,
    delivery of the shield gas concurrently with delivery of the metal powder from the co-axial powder supply annulus (140).

11. The smart additive manufacturing device of claim 1 further comprising a shield gas diffuser (210) within an integrated shield gas diffuser cowling (220).

12. The smart additive manufacturing device of claim 1 wherein the plurality of off-axis laser light lens assemblies (115) are off-axis 25 to 35 degrees.

13. A method of concurrently depositing a plurality of feed materials on a substrate comprising:

(305) activating a plurality of lasers to send energized light through a plurality of off-axis laser light lens assemblies (115) to output a plurality of off-axis high-power laser light beams capable of melting a metal feed material comprising a metal powder from a co-axial powder supply annulus (140) and metal wire from a central deposition nozzle (150), (310) feeding the metal feed material comprising the metal powder from the co-axial powder supply annulus (140) and the metal wire from the central deposition nozzle (150) concurrently through a concurrent deposition housing (180), (315) detecting a wire feed pressure of the metal wire to regulate a wire feed rate, and (320) adjusting the wire feed rate to concurrently add the metal feed material comprising the metal powder from the co-axial powder supply annulus (140) and the metal wire from a central deposition nozzle (150).

14. The method of claim 13 further comprising delivering shield gas concurrently with delivery of the metal powder.

15. The method of claim 13 further comprising delivering shield gas coaxially from a co-axial powder supply shield gas channel (145) with delivery of the metal wire from an integrated wire pull system with automatic feed pressure control (160).

16. The method of claim 13 wherein feeding the metal feed material comprising the metal powder from a co-axial powder supply annulus (140) and the metal wire from the central deposition nozzle (150) occurs concurrently through the concurrent deposition housing (180) and is capable of depositing the metal feed material as a homogenous metal, semi-circular bead.

17. The method of claim 13 further comprising creating a sequentially layered three-dimensional structure created of the metal feed material comprising the metal powder from the co-axial powder supply annulus (140) and the metal wire from the central deposition nozzle (150) fed concurrently through the concurrent deposition housing (180).

* * * * *